Figure 1:
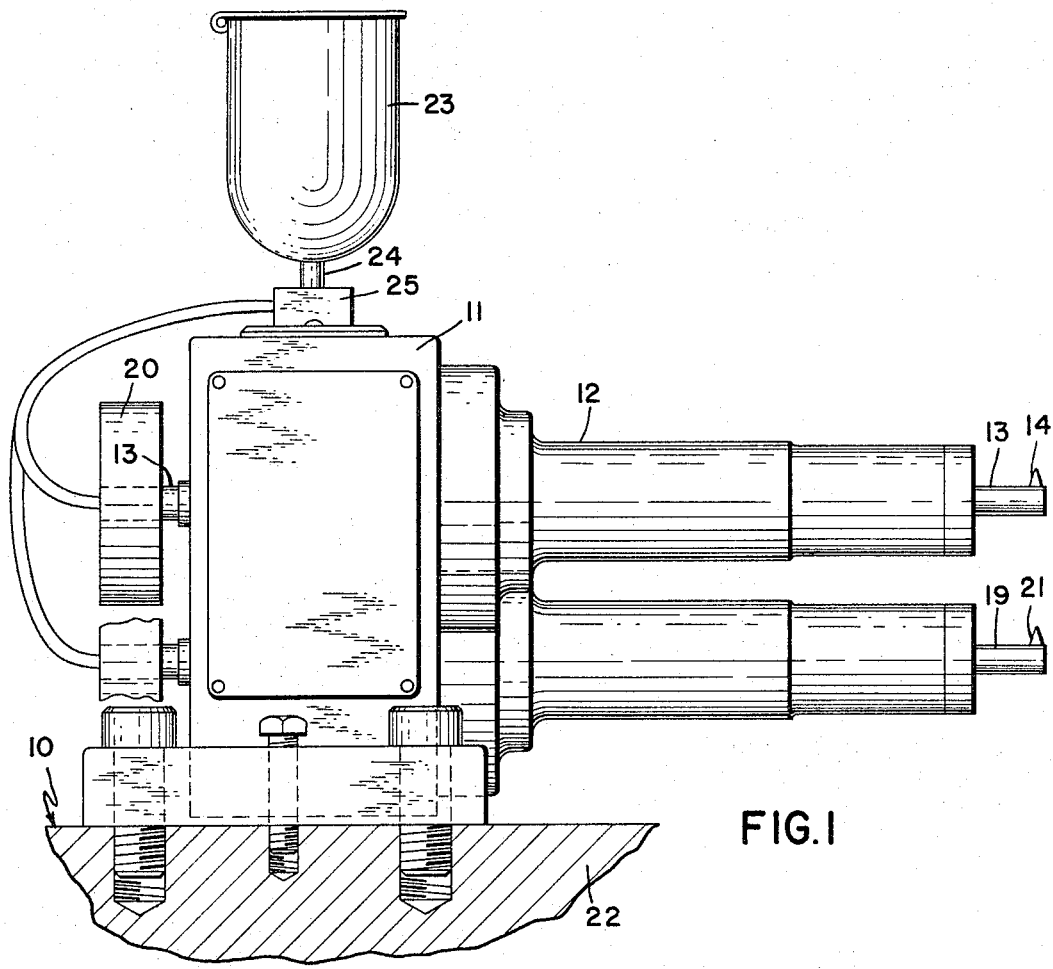

May 14, 1968  A. H. JACOBSON  3,382,739
MACHINE TOOL

Filed March 14, 1966  3 Sheets-Sheet 1

INVENTOR.
Alden H. Jacobson
BY
Norman J. Blodgett
ATTORNEY

May 14, 1968

A. H. JACOBSON 3,382,739

MACHINE TOOL

Filed March 14, 1966

3 Sheets-Sheet 2

INVENTOR.
Alden H. Jacobson
BY
ATTORNEY

May 14, 1968   A. H. JACOBSON   3,382,739
MACHINE TOOL
Filed March 14, 1966   3 Sheets-Sheet 3
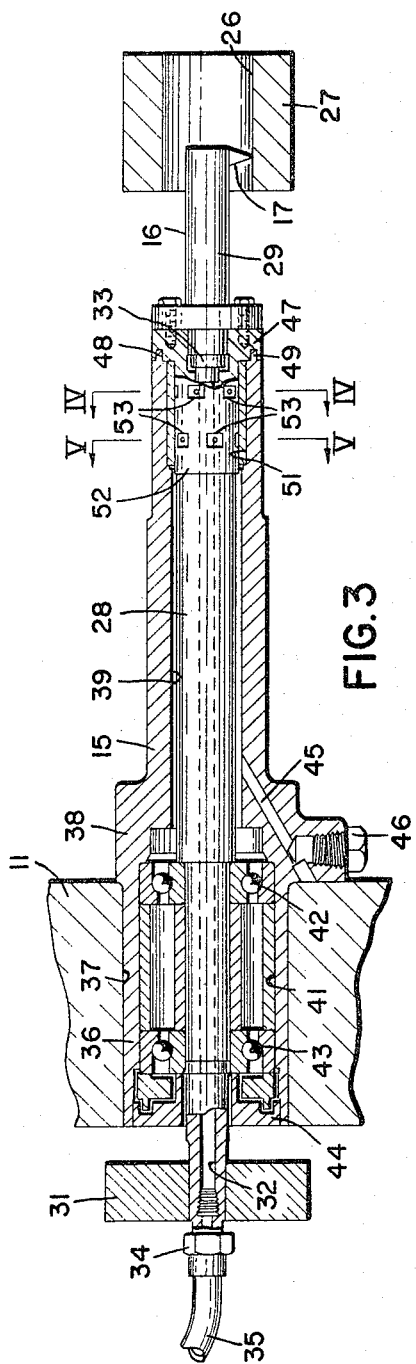
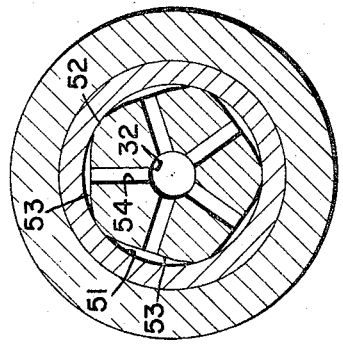
FIG. 4
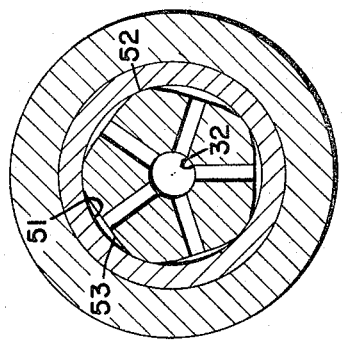
FIG. 5
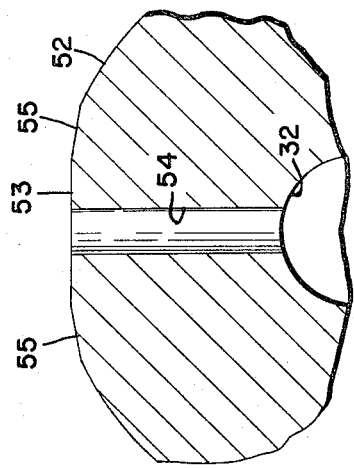
FIG. 6
*INVENTOR.*
Alden H. Jacobson
BY
Alden S. Blodgett
ATTORNEY

# United States Patent Office 3,382,739
Patented May 14, 1968

3,382,739
MACHINE TOOL
Alden H. Jacobson, Paxton, Mass., assignor to The Heald Machine Company, Worcester, Mass., a corporation of Delaware
Filed Mar. 14, 1966, Ser. No. 534,096
9 Claims. (Cl. 77—3)

This invention relates to a machine tool and, more particularly, to apparatus arranged to generate a surface of revolution by rotation of a tool-carrying spindle within a workpiece.

In the machining of bores and the like, it is often necessary to generate a surface of revolution by means of a single point tool fastened to the end of a cantilevered spindle. Particularly where the bore is long and narrow, the spindle must, of necessity, be relatively thin and, therefore, subject to bending. Difficulty is experienced in this regard where the spindle itself is rotated while the workpiece remains fixed. In such a case, the spindle must be carried in bearings and, because of the nature of the deep bore, the bearing must be spaced a considerable distance from the point tool, so that the effect of bending is especially encountered. Furthermore, the thin cantilevered shape of the spindle causes certain vibrations to take place, the bending and vibrations bringing about poor surface finish and inaccuracies in geometry of the surface. These and other difficulties experienced with the prior art devices have been obviated in a novel manner by the present invention.

It is, therefore, an outstanding object of the invention to provide a machine tool in which a thin, rotatable spindle is supported so as to be subject to relatively little bending.

Another object of this invention is the provision of a machine tool in which the tool is carried on a thin cantilevered spindle and in which excellent quality of surface finish and of geometry are maintained.

A further object of the present invention is the provision of a stiff spindle for a machine tool, wherein the construction is relatively simple to manufacture, is rugged in nature, and, therefore, is capable of serving a long life of useful service with a minimum of maintenance.

It is another object of the instant invention to provide a machine tool having a spindle with a bearing support close to the place where the tool is mounted, a novel means being provided for supplying the bearing with lubricant.

It is another object to provide a machine tool having a spindle in which the free end of the spindle is supported by a hydrodynamic bearing.

With these and other objects in view, as will be apparent to those skilled in the art, the invention resides in the combination of parts set forth in the specification and covered by the claims appended hereto.

Figure 2:
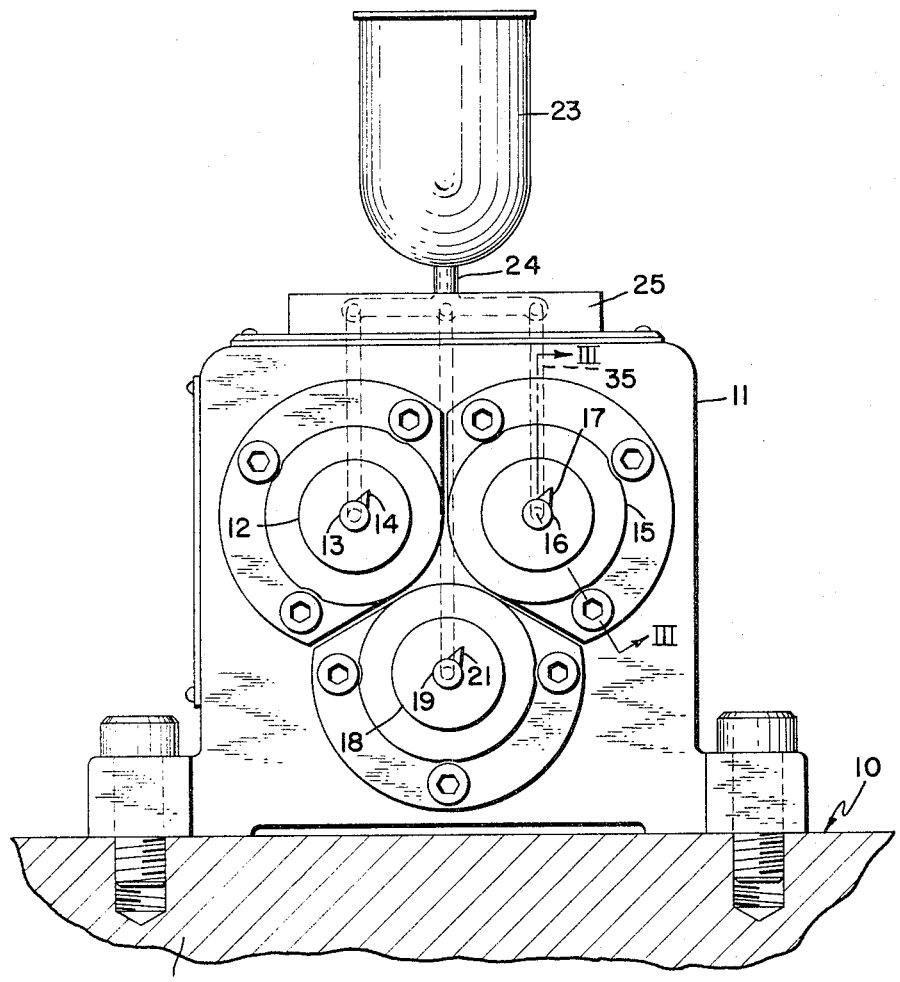

The character of the invention, however, may be best understood by reference to one of its structural forms as illustrated by the accompanying drawings in which:

FIG. 1 is a side elevational view of a machine tool incorporating the principles of the present invention, FIG. 2 is a front elevational view of the tool, FIG. 3 is a sectional view of the tool taken on the line III—III of FIG. 2, FIG. 4 is a transverse section of the tool taken on the line IV—IV of FIG. 3, FIG. 5 is a sectional view of the invention taken on the line V—V of FIG. 3, and FIG. 6 is an enlarged portion of the apparatus shown in FIG. 5.

Referring to FIGS. 1 and 2, in which are best shown the general features of the invention, the machine tool, indicated generally by the reference numberal 10, is shown as provided with a tool head 11 in which is mounted a sleeve 12. Rotatable in the sleeve is a spindle 13 carrying at one end (outboard of the sleeve 12) a single-point tool 14. At the other end, which extends from the other side of the head 11, is carried a drive wheel 20. Also mounted in the head 11 parallel to and on the same horizontal level with the sleeve 12 is a sleeve 15 having a spindle 16 and a tool 17. Below the sleeve 12 and the sleeve 15 is a third sleeve 18 in which is carried a spindle 19 with a tool 21. As is clear in FIG. 2, the three sleeves are grouped together closely to form a triangular set of three spindles and tools.

The head 11 is bolted on a machine tool base 22 and carries on its upper surface a reservoir 23 containing fluid which passes through a tubular supporting post 24 into a manifold block 25 which is bolted to the top of the housing 11.

FIG. 3 shows the details of the sleeve 15 and its spindle 16 and shows the tool 17 operating to finish a surface 26 of a workpiece 27. The spindle 16 consists of a one-piece inner portion 28 and a short outer portion 29. The inner portion 28 extends rearwardly of the head 11 and is provided with a drive pulley 31. A bore or passage 32 extends longitudinally through the inner portion 28 and is blocked by a plug 33 at the outer end and is attached through a rotatable coupling 34 and a flexible tube 35 to the reservoir 23.

The sleeve 15 is provided with a cylindrical portion 36 which fits tightly in a bore 37 in the head 11. An enlarged portion or hub 38 is formed in the sleeve and is provided with a radial shoulder which presses against the side of the head 11 opposite the side occupied by the drive pulley 31. The remainder of the sleeve is relatively small in diameter and is provided with an internal bore 39 within which lies the inner portion 28 of the spindle 16. The cylindrical portion 37 of the sleeve 15 is provided with a counterbore 41 which is coextensive with the head 11 and within which is tightly fitted the outer races of antifriction bearings such as ball bearings 42 and 43. The mouth of the counterbore 41 is closed by a seal member 44 and the bearings are held in place by this means. A suitable drain passage 45 extends away from the bore 39 in the vicinity of the hub 38 and is normally closed by a plug 46. At its outer end the inner portion 28 of the spindle 16 is provided with an enlarged head 47 to which the outer portion 29 is bolted. This head is circular and has the same external diameter as the sleeve 15 in that vicinity. The outer end of the sleeve 15 is provided with an annular tongue 48 which resides in a similar annular groove 49 formed in the adjacent surface of the head 47 of the spindle, these two cooperating to provide a suitable seal. At the extreme end of the sleeve 15 is provided a cylindrical counterbore 51. The surface of this counterbore cooperates with a slightly enlarged portion 52 of the spindle to form a hydrostatic bearing. The enlarged portion 52 of the spindle is provided with a series of lands 53 which are all connected to the passage 32 to receive fluid therefrom. These lands are grouped in the two sets which are spaced from one another longitudinally of the spindle and which are shown, respectively, in FIGS. 4 and 5. The lands, in the preferred embodiment, are spaced 22° apart, there being five in number. Each land 53 is joined to the passage 32 by a radial passage 54. In general, in each set the number of lands is a prime number and, furthermore, each land 53 is located midway between two lands in the other set.

As is clear from FIG. 6, each land 53 is provided on either side with an angular bevel 55 which extends between the land surface and the cylindrical surface of the enlarged portion 52 of the spindle. As is shown in the drawing, the land and the bevels occupy about 25° of the circumference of the spindle and the bevels 55 are arranged at approximately 10° to the flat surface of the land 53.

The operation of the invention will now be readily understood, in view of the above description. When the drive pulleys, such as the drive pulley 31, are driven, the three spindles 13, 16, and 19 rotate, carrying their tools 14, 17, and 21 with them. In the case of the spindle 16, the tool 17 generates a surface of revolution 26 in the workpiece 27. Oil flows from the reservoir 23 through the tube 24 into the manifold block 25. From there it passes to each of the three spindles. In the case of the spindle 16, the fluid passes through the flexible tube 35, through a rotatable coupling 34 into the passage 32. The oil goes axially through the passage to the other end where it flows into the radial passages 54 to the lands 53. Since the spindle is rotating, a hydrodynamic wedge is formed between the surface of the enlarged portion 52 of the spindle and the cylindrical surface 51 of the sleeve 15. According to the well-known principles of hydrodynamic films, any attempt to move the spindle 16 laterally in the counterbore 51 results in an increase in pressure in the hydrodynamic bearing at the side opposite the side in which force is applied. The tendency, therefore, is to centralize the spindle within the sleeve 15 and prevent it from bending. The sleeve 15 provides a suitable rigid reference member for the spindle and, because of its nature, is subject less to bending than the spindle itself would be. Nevertheless, the spindle is thin, elongated, and is capable of being carried in ball bearings 42 and 43 of a small size.

It can be seen that, although the reservoir 23 furnishes the passage 32 with oil under gravity feed, no problem is encountered in carrying the fluid to the lands 53. This is because, as the spindle rotates, oil which arrives opposite the passages 54 is thrown outwardly by centrifugal force and carried into the wedge-shaped space between each land 53 and the adjacent surface of the counterbore 51. The staggering of the lands 53 in the two longitudinally spaced sets, and the use of a prime number of lands in each set, results in a distribution of the resistance to movement of the spindle in the bearing, obviates the need for a great number of lands, and permits the lands in each set to be spaced far enough apart so that a substantial hydrodynamic film can be developed.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   (a) a head,
   (b) a sleeve fixedly mounted in the head,
   (c) an elongated spindle mounted for rotation in the sleeve, one end of the spindle and the sleeve lying within the head and the other end lying a substantial distance from the head,
   (d) a bearing lying between the spindle and the sleeve at a first position, and
   (e) a hydrodynamic bearing lying between the spindle and the sleeve at a second position substantially spaced from the first position.

2. A machine tool as recited in claim 1, wherein a passage extends longitudinally through the spindle to carry fluid from the said one end thereof to the hydrodynamic bearing at the said other end.

3. A machine tool as recited in claim 2, wherein a fluid reservoir is mounted on the head and is joined to the passage by a flexible tube and a rotatable fluid coupling.

4. A machine tool as recited in claim 1, wherein the bearing at the said one end is an anti-friction bearing.

5. A machine tool as recited in claim 1, wherein the hydrodynamic bearing is formed by a cylindrical inner surface of the sleeve and a series of flat lands formed on the spindle.

6. A machine tool as recited in claim 5, wherein the series of lands consists of two circumferential sets spaced longitudinally of each other along the spindle, each set consisting of a prime number of lands evenly spaced around the spindle, each land of one set being located circumferentially between two lands of the other set.

7. A machine tool as recited in claim 5, wherein each land is provided with fluid through a main passage extending longitudinally of the spindle and through a radial passage joining the main passage to the land.

8. A machine tool, comprising
   (a) a head,
   (b) a sleeve fixedly mounted in the head,
   (c) an elongated spindle mounted for rotation in the sleeve, one end of the spindle and the sleeve lying within the head and the other end lying a substantial distance from the head, a passage extending longitudinally through the spindle to carry fluid from the said one end thereof to the said other and,
   (d) an anti-friction bearing lying between the spindle and the sleeve at the said one end,
   (e) a hydrodynamic bearing formed by a cylindrical inner surface of the sleeve and a series of flat lands formed on the spindle lying within the spindle and the sleeve at the said other end, the series of lands consisting of two circumferential sets spaced longitudinally of each other along the spindle, each set consisting of a prime number of lands evenly spaced around the spindle, each land of one set being located circumferentially between two lands of the other set, each land being provided with fluid from the main passage through a radial passage joining the main passage to the land, and
   (f) a fluid reservoir mounted on the head joined to the passage by a flexible tube and a rotatable fluid coupling.

9. A machine tool, comprising
   (a) a head,
   (b) a sleeve fixedly mounted in the head,
   (c) an elongated spindle mounted for rotation in the sleeve,
   (d) a bearing lying between the spindle and the sleeve at one end, and
   (e) a hydrodynamic bearing lying between the spindle and the sleeve at the other end, the hydrodynamic bearing being provided with fluid through a main passage extending longitudinally of the spindle and through radial passages extending from the main passage to the surface of the spindle.

References Cited

UNITED STATES PATENTS 3,200,671   8/1965   Porath _____ 90—11
3,260,162   7/1966   Atherton _____ 77—3

FOREIGN PATENTS 1,166,589   3/1964   Germany.

GERALD A. DOST, *Primary Examiner.*